United States Patent [19]

Robinette

[11] 4,168,015
[45] Sep. 18, 1979

[54] TIRE INFLATION DEVICE

[75] Inventor: Roger L. Robinette, Broadview Hts., Ohio

[73] Assignee: Parker-Hannifin Corporation, Cleveland, Ohio

[21] Appl. No.: 899,134

[22] Filed: Apr. 24, 1978

[51] Int. Cl.² .................. B65B 31/00; B67D 5/32
[52] U.S. Cl. ............................... 222/3; 137/881; 141/38; 251/118; 285/DIG. 25
[58] Field of Search .................... 138/42; 141/18, 28, 141/67, 251, 352, 360, 362, 383, 57, 285, 292–295, 301, 302, 310; 137/223, 880, 881; 152/415; 222/3, 564; 251/118; 285/DIG. 25, 13, 14

[56] References Cited
U.S. PATENT DOCUMENTS

| 2,297,817 | 10/1942 | Truxell, Jr. et al. | 138/42 X |
| 2,995,147 | 8/1961 | Bergquist | 251/118 X |
| 3,570,714 | 3/1971 | Ferguson | 141/18 X |

Primary Examiner—Frederick K. Schmidt
Attorney, Agent, or Firm—John N. Wolfram

[57] ABSTRACT

A device for filling pneumatic tires. The device includes a container for gas under pressure and upon which a dispensing head is mounted. The head has a passage leading from the interior of the container and there is a tire valve in the passage movable to opened and closed positions. An orifice in the passage inwardly of the valve has a flow capacity less than the valve to determine the maximum flow rate of gas from the container. The dispensing head has a sealed and threaded connection to the container and there is a relief port connecting the passage at a point between the valve and orifice with the threaded connection inwardly of the sealed connection and effective to bleed gas from the container to atmosphere when the dispensing head is unthreaded from the container far enough to break the sealed connection but before the threads are completely disengaged.

7 Claims, 4 Drawing Figures

TIRE INFLATION DEVICE

FIELD OF THE INVENTION

This invention pertains to a device for filling a tire with gas and more particularly to a container for the gas and with a means to control the maximum rate of flow of the gas from the container and with a means to bleed the gas from the container when removing a dispensing head from the container.

BACKGROUND OF THE INVENTION

Small portable containers for gas under pressure have been used for inflating automobile tires in an emergency. Such containers, one form of which is disclosed in U.S. Pat. No. 2,498,596, have a dispensing head with a passage that is normally closed by a high pressure tire valve core. When a tire is to be inflated, the dispensing head is attached to the tire valve stem to cause the tire valves in both the stem and in the dispensing head to open whereby the gas passes from the container into the tire. Similar containers for dispensing gas under pressure have also been used for other purposes. For example, U.S. Pat. No. 3,570,714 discloses a device for dispensing oxygen for medical purposes. It likewise uses a conventional tire valve to normally close a passage leading from the container. There is also a check valve between such tire valve and the interior of the container. This check valve has a small orifice through which the oxygen must pass to prevent too rapid discharge from the container.

These and other prior devices for dispensing gas under pressure from a container utilize moving parts that may become jammed and do not make adequate provision to discharge the gas from the container when unthreading the dispensing head whereby pressurized gas still in the container when the head is completely unthreaded therefrom may blow the head away from the container and cause bodily harm or other damage.

SUMMARY OF THE INVENTION

The present invention provides a container for pressurized gas with a dispensing head that has a restricted orifice to limit the flow rate of the gas from the container and which orifice is in a fixed position relative to the head for simplicity, economy of manufacture and to avoid jamming of moving parts. The head also has a relief port that connects the interior of the container to atmosphere upon partial unthreading of the head from the container to relieve the pressure so that the head will not blow off from the container upon full unthreading.

DETAIL DESCRIPTION

Figure 1:
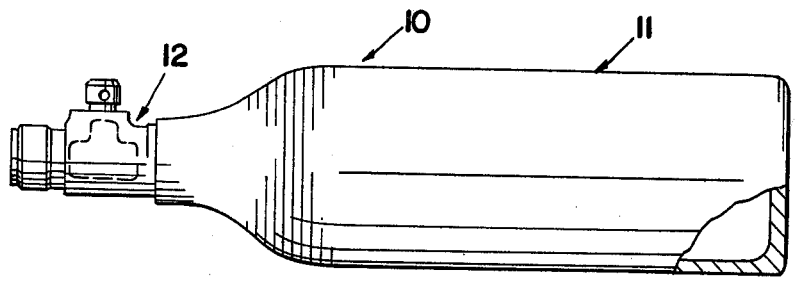
FIG. 1 is an outside view of the container with the dispensing head attached thereto.

The device 10 includes a container 11 to which a dispensing head 12 is attached. The container has a threaded bore 15, a tapered and smooth counterbore 16 and a transverse sealing surface 17.

The dispensing head 12 includes a body 20 having a threaded extension 21 for threaded attachment to threaded bore 15, a smooth cylindrical surface 22 and a transverse sealing surface 23. A lead washer 26 makes sealing contact with surfaces 17 and 23 and there is an elastomeric packing ring 27, preferably of initial circular cross section, that makes sealing contact with surfaces 16 and 22.

Body 20 has a bore 28 into which a plug 29 is press fit to retain the plug at a fixed position. Plug 29 has a tapered opening 31 that connects with a cylindrical bore 32 which in turn connects with a restricted orifice 33. At its outer end body 20 has mounted therein a high pressure tire valve generally designated 34. The tire valve is threaded into the body as at 35 and is sealed relative thereto by being seated against a tapered shoulder 37. As is well known in tire valves of this type, a valve seal 38 is carried by a valve stem 39 and is normally maintained in sealing contact with a fixed seat portion by a spring and is opened by movement of stem 39 inwardly. When in open position, the flow path through the tire valve is of greater capacity than orifice 33 of plug 29.

Body 20 has an undercut 40 in which an elastomeric packing ring 41 is mounted and there is a bore 42 leading to the exterior of body 20. Body 20 has another bore 44 that intersects bore 28 and which leads to a threaded counterbore 45 into which a safety plug 46 is threaded to clamp a frangible disk 47 against a shoulder 48 to close bore 44. Plug 46 has passage 49,50. This is a well known safety device to prevent container 11 from exploding in the event it becomes heated and the gas pressure rises. In the latter case, disk 47 will rupture upon the gas pressure reaching a predetermined value and thus discharge the container before the gas pressure can reach an unsafe level.

Body 10 has another relief port 52 that intersects bore 28 between orifice 33 and tire valve 34 and which connects with the upper portion of threaded bore 15 at the tapered smooth wall portion 16 thereof when head 20 is fully threaded into container 11 with washer 26 and packing 27 in sealing contact with the head and container.

The flow capacity of the relief port 52 is greater than that of the orifice 33.

Figure 3:
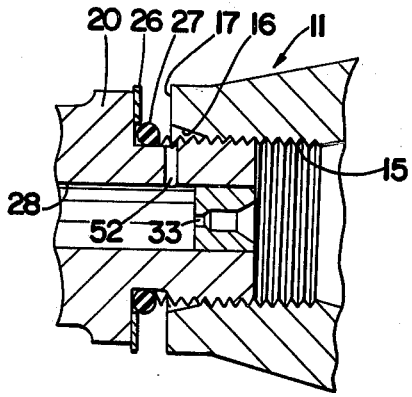
FIG. 3 is a fragmentary cross section view showing the dispensing head partially unthreaded from the container.

As shown in FIG. 3, when head 20 is partially unthreaded from container 11, washer 26 and packing 27 will be separated from sealing contact with container 11 and gas under pressure in container 11 will pass through orifice 33 into bore 28 and relief port 52 into tapered counterbore 16 and past surface 17 washer 26 and packing 27 to atmosphere and thus relieve the pressure within the container before head 20 is completely unthreaded from container 11. This is a safety feature to prevent head 20 from being blown away from container 11, and possibly cause injury or damage, when the head 20 is unthreaded from the container while pressurized gas is in the latter.

A preferred gas for tire inflation purposes is carbon dioxide, although other gases may be used. Because orifice 33 is smaller in flow capacity than the passage through tire valve 34 when the latter is fully open, any icing up that may occur as the gas is being discharged will occur at orifice 33 rather than at tire valve 34. This is important because icing of the tire valve may prevent it from closing and loss of all the gas from the container may occur even though it was intended to discharge only a small portion thereof.

Figure 2:
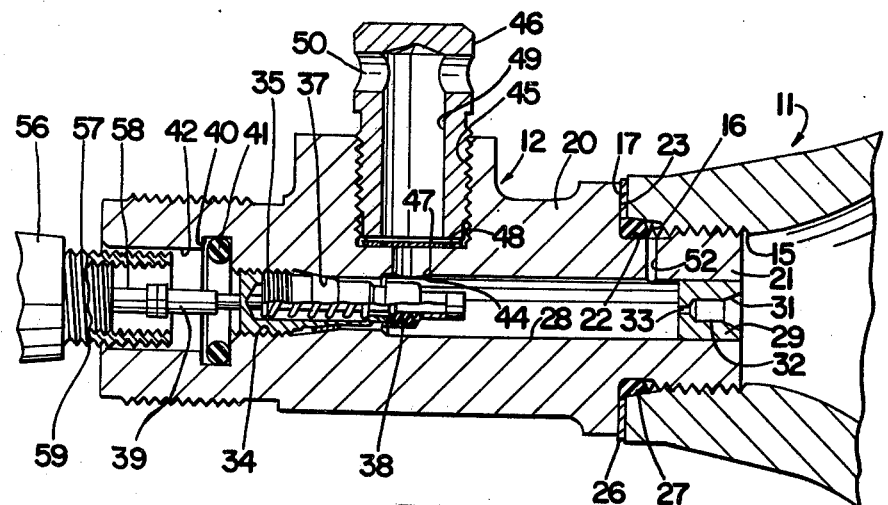
FIG. 2 is an enlarged cross section view of the dispensing head as mounted upon the container.

To fill a tire, the dispensing head 12 is brought into position with respect to stem 56 of the tire with the tire stem threaded extension 57 within bore 42. When stem extension 57 is only partially inserted into bore 42, as shown in FIG. 2, stem 58 of a conventional tire valve 59 engages stem 39 of tire valve 34. Upon further insertion of dispensing head 20 over tire valve stem 56, both tire valves 34 and 59 will open and extension 57 will engage packing 41 to seal against passage of gas through bore 42 around the exterior of extension 57 to atmosphere whereby gas will pass from the container 11 through orifice 33, bore 28, valve 34 and valve 59 into the tire. Upon removal of dipensing head 12 from tire valve stem 56, valves 34 and 59 will automatically close.

Although the device disclosed herein has particular application for filling pneumatic tires with gas in an emergency, it may have application for other purposes where it is intended to dispense gas under pressure from one container into another.

Figure 4:
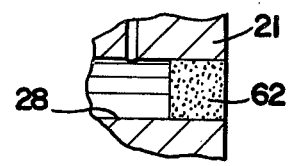
FIG. 4 is a fragmentary cross section view showing an alternate form of orifice member.

In the modification of FIG. 4 a plug 62 of sintered powdered metal is substituted for the plug 29 shown in FIG. 2. In this case there is no drilled orifice through the plug. Instead, the porosity of the plug is such that it has a lower flow capacity than tire valve 34, or stated another way, has a greater pressure drop therethrough at a given upstream pressure than does tire valve 34. The sintered metal also acts as a filter for particles of foreign matter and because of it has many very small passages for fluid is not susceptible to sudden blockage of all flow, as might be the case with orifice 33 if the latter becomes blocked by dirt or other solid foreign matter.

I claim:

1. In a device for dispensing gas under pressure, a container for the gas, said container having an opening, a dispensing head mounted on the container and closing said opening, a passage through the head and communicating with the interior of the container, a valve in the passage and movable to open and closed positions for controlling flow of gas through said passage, said passage including an orifice between the valve and the container interior, said orifice being of less flow capacity than the valve when the valve is open, said container having a threaded bore, said head having a threaded extension engaging the threaded bore and sealing means sealingly engaging the container axially outwardly of the threaded engagement, said head having a relief port connecting the threaded bore to the passage at a location between the orifice and the valve, said sealing means including an elastomeric packing ring in said threaded bore, said relief port communicating with said threaded bore axially inwardly of the packing ring, and said threaded bore including an unthreaded counterbore that engages the packing ring during said sealing engagement and which upon unthreading of the head from the container disengages from the packing ring before said threads are completely disengaged.

2. The dispenser of claim 1 in which said orifice is in a plug mounted in said passage.

3. The dispenser of claim 2 in which said plug is press fitted within said passage.

4. The device of claim 1 in which the flow capacity of the relief port is greater than that of the orifice.

5. The device of claim 1 in which said relief port, when the head is in said sealed engagement with the container, communicates directly with said unthreaded counterbore.

6. In a device for dispensing gas under pressure, a container for the gas, said container having an opening, a dispensing head mounted on the container and closing said opening, a passage through the head and communicating with the interior of the container, a valve in the passage and movable to open and closed positions for controlling flow of gas through said passage, said passage including an orifice between the valve and the container interior, said orifice being of less flow capacity than the valve when the valve is open, said orifice being in a fixed position relative to said body, said container having a threaded bore, said head having a threaded extension engaging the threaded bore and sealing means sealingly engaging the container axially outwardly of the threaded engagement, said head having a relief port connecting the threaded bore to the passage at a location between the orifice and the valve, said extension having a smooth cylindrical surface axially outwardly of the threaded engagement, a sealing ring in engagement with said surface and said container, said relief port intersects the exterior of said extension in the threaded portion thereof and said surface being on a diameter less than the major diameter of the thread on said extension whereby said thread on the extension retains the packing ring on said surface in a position where it does not block said relief port.

7. The device of claim 6 in which there is a porous sintered metal plug in said passage and said orifice comprises a plurality of flow channels through said plug.

* * * * *